United States Patent Office 3,072,211
Patented Jan. 8, 1963

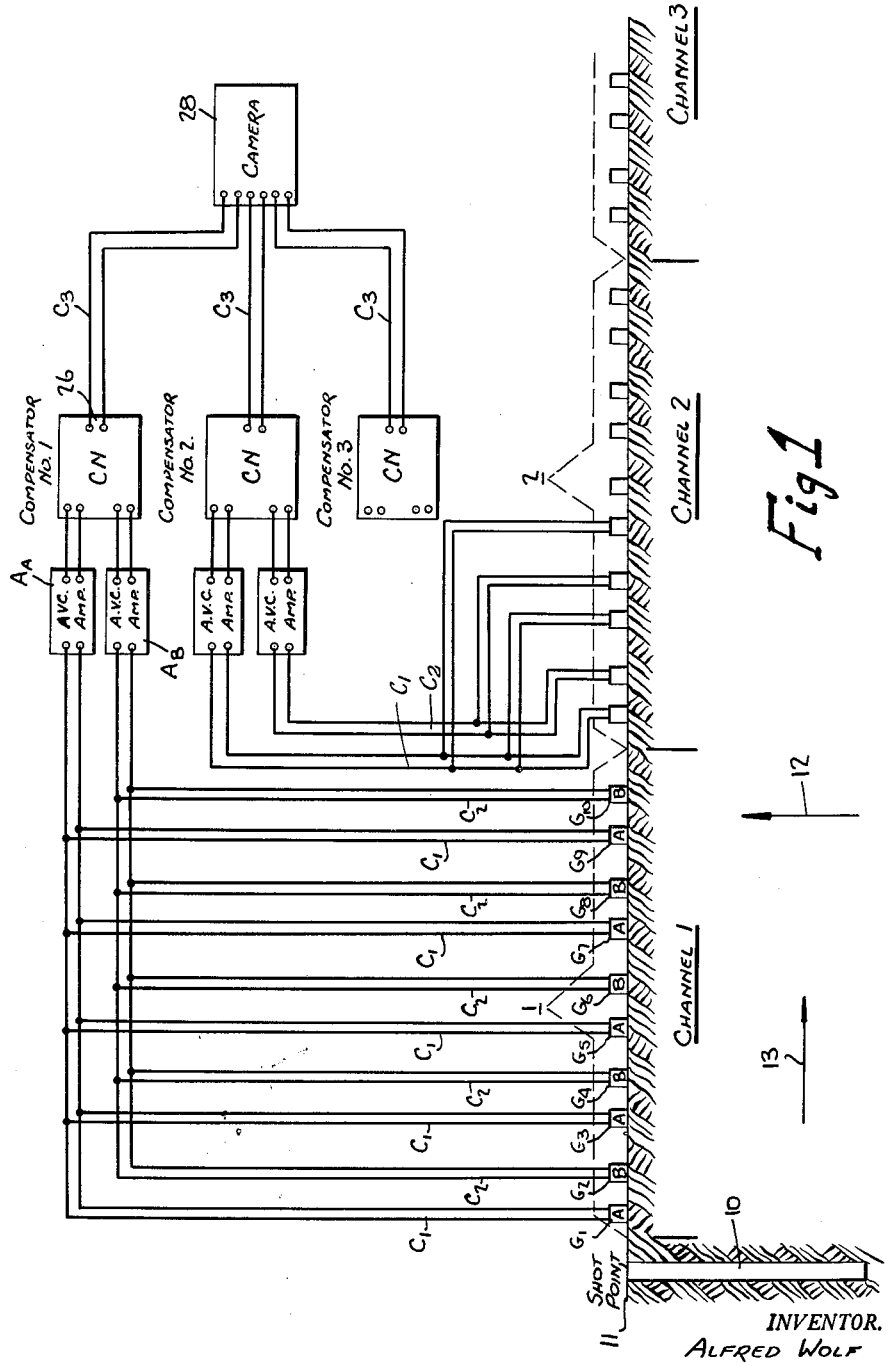

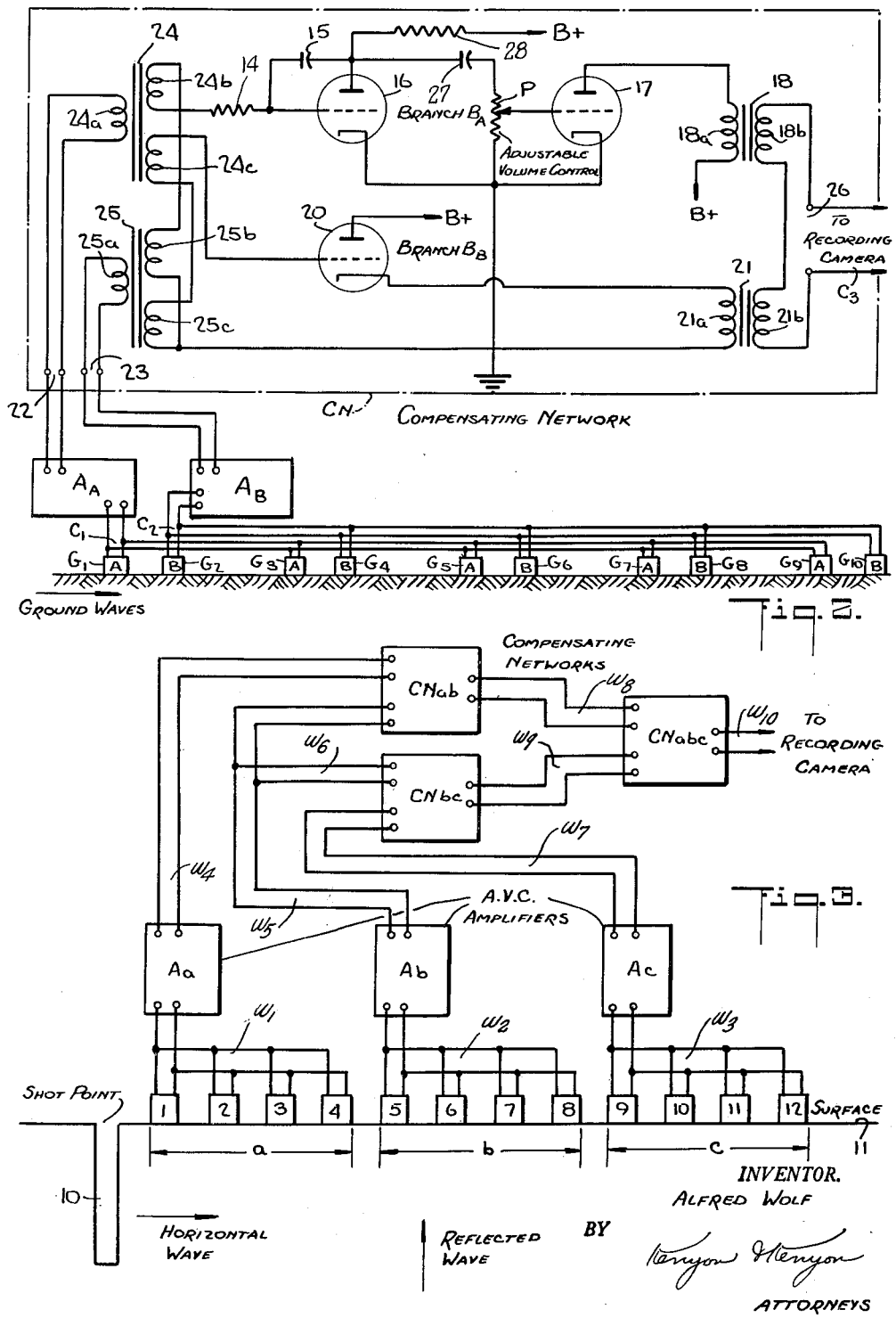

3,072,211
MULTIPLE GEOPHONE RECORDING SYSTEM FOR SEISMIC PROSPECTING
Alfred Wolf, Tulsa, Okla., assignor to Geophysical Research Corporation, New York, N.Y., a corporation of New Jersey
Filed Nov. 10, 1959, Ser. No. 852,145
7 Claims. (Cl. 181—0.5)

My invention pertains generally to techniques and apparatus for seismic reflection prospecting and more particularly to multiple geophone recording systems adapted to discriminate against ground waves propagated with two or more distinct velocities and thereby provide more accurate seismic records. This application is a continuation-in-part of my copending application No. 692,741, filed October 28, 1957, now United States Patent No. 2,993,555.

In seismic reflection prospecting, it is the usual practice to detonate an explosive charge from a shot point near the surface of the ground and to detect the resultant earth motion at a plurality of stations set up on a line with the shot point. Generally the instruments are in the form of seismometers or geophones placed on the surface of the ground. The seismometers or geophones translate the earth motion into corresponding electrical signals, the signals being amplified, and fed to a seismic recording camera where they are made to register on a moving strip of photographically sensitive paper to produce a graphical picture of earth motion at each seismometer station. Provision is also made to record in the camera the instant of explosion and to time the record.

In one simple seismic reflection system, five geophones (or some other number) are placed at spaced positions on the earth's surface relative to a shot point, each geophone being connected through a separate amplifying channel to a recording camera which produces a record having five distinct traces. Each trace is a graphical representation of earth motion at the associated geophone station, plotted against time.

Experience has shown that the system in which one geophone is employed per channel, as described above, works well only in a few regions, and that in many instances it is necessary to develop more complex seismic patterns. The reason for this requirement is that when recording reflections from a formation interface, numerous types of ground waves are propagated from the shot point which arrive at the geophones at the same time as do reflections. Thus it becomes essential to discriminate between reflections and interfering ground waves. Where the ground waves are of high amplitude, such discrimination is difficult to effect. This complication has been recognized in the seismic prospecting art for a long time, and various expedients have heretofore been proposed for obviating it.

One known method involves filtering out the low frequency components of earth motion picked up by the geophones. The rationale for this method is the predominance of low frequency components in the ground wave disturbance. However, even when the low frequency components are eliminated, the remaining wave components are often of sufficient intensity to create serious interference with the recording of the reflected waves.

A second known method makes use of multiple geophone patterns wherein the outputs of two or more individual geophones are combined and recorded as a single trace on the graph. Thus in the five channel seismographic system mentioned previously, in place of a single geophone in each channel, a set of five geophones may be provided placed in line with the shot point. The signals produced by the set of the five geophones in each channel are added, amplified, and then recorded. Since reflections arrive in phase coincidence at the several geophones of a single channel whereas the phase of the ground waves at the various geophone locations is not the same, reflections are reinforced whereas ground waves tend to cancel each other. While this expedient serves to reduce the effect of interfering waves in difficult areas, it is not always successful.

In my patent entitled "Seismic Prospecting Technique," Serial No. 658,574, filed May 13, 1957, issued as Patent No. 2,872,995 on February 10, 1959, there is disclosed a technique wherein two matched geophones are buried at vertically spaced positions below a shot point, the geophones being responsive only to vertical motion. A compensating network is provided which acts to combine additively a first value representing a linear function of a portion of the sum of the outputs of the two geophones with a second value representing a portion of the same linear function of the time integral of the difference of the outputs (the lower geophone minus upper geophone). By "linear function" is meant the geophone output itself, its derivative, integral, any combination of signal derivative and integral, etc. The relative proportions of the additively combined values are adjusted to annul the effect of direct waves from the shot point, and the resultant output of the compensating network is fed through a suitable amplifier to the seismic recorder. This arrangement effects a substantial improvement in seismic recording.

In very difficult areas, where ground waves have a relatively great amplitude, the foregoing methods are sometimes insufficient to afford usable reflections. Accordingly, it is the principal object of this invention to provide a method and apparatus for seismic prospecting operative in difficult areas to minimize undesired components of earth motion at the arrival time of reflection. The invention is intended for installation in such areas in conjunction with both filtering techniques and a multiple geophone pattern, even though in principle it could be practiced with only two geophones per seismograph channel.

More specifically it is an object of the invention to provide a multiple channel seismic recording system, each channel of which includes two groups of geophones acting in conjunction with a compensating network so as to reduce substantially the disturbing effect of ground waves.

A further object of the invention is to provide a system for cancelling the effects of waves propagated with two or more distinct velocities.

Briefly stated, in a system in accordance with the invention, each seismographic channel makes use of two groups of geophones, each group containing an equal number of geophones. The geophones of the first group are placed at spaced ground points on a line extending from the shot point, and the geophones of the second group are also placed along the same ground line, each geophone of the second group being displaced a short distance (the same for all geophone pairs) horizontally away from the shot point relative to the corresponding geophone in the first group. The displacement is less than one-quarter wave length of the shortest ground wave which is to be eliminated.

The geophones of the first group are connected together, and their combined signals are amplified to provide a first output voltage. Similarly, the geophones of the second group are connected together, and their combined signals are amplified to provide a second output voltage. The first and the second output voltages are fed to a compensating network of the type set forth in the above-mentioned copending application to develop a resultant output voltage which is then fed into the camera to produce one channel trace on the seismograph record. The other channel traces are produced by identical group geophone arrangements.

In another embodiment of the invention, the system is adapted to cancel the effects of waves propagated with two or more distinct velocities. As applied to two distinct velocities, two groups of geophones $a$ and $b$ are combined through a compensating network to cancel waves of a velocity $V_1$. The geophones of group $b$ and a third group $c$ are combined to cancel waves of the same velocity $V_1$ by the use of a second compensating network. The outputs of the two networks are then fed to the two inputs of still another compensating network to cancel waves of a different velocity $V_2$.

For a better understanding of the invention as well as other objects and further features thereof, reference is made to the following detailed description to be read in conjunction with the accompanying drawings wherein like components in the several views are identified by like reference numerals.

In the drawings:

FIG. 1 is a block diagram of a seismic prospecting system in accordance with the invention.

FIG. 2 is a schematic circuit diagram of one channel of the system.

FIG. 3 is a block diagram of another embodiment of the invention.

*The Structure of the Seismic Prospecting System*

Referring now to FIG. 1, there is shown a three channel seismic prospecting system operating in conjunction with a shot hole 10 formed below the surface of the earth represented by horizontal line 11. The channels are identified by numerals 1, 2 and 3. An explosive charge is detonated in the shot hole 10 to create a localized disturbance. Seismic energy is propagated in all directions, and a portion of this energy, as represented by arrow 12, is reflected upwardly from various strata interfaces or sub-surface beds. The disturbance also produces surface waves represented by arrow 13. It is these surface waves which are to be eliminated by the invention in order to obtain accurate seismic readings.

Each of the channels 1, 2 and 3 makes use of ten geophones $G_1$ to $G_{10}$, divided equally into two groups A and B. Group A consists of the odd numbered geophones $G_1$, $G_3$, $G_5$, $G_7$ and $G_9$; group B consists of the even numbered geophones $G_2$, $G_4$, $G_6$, $G_8$ and $G_{10}$. The geophones are of identical construction and are designed to be responsive solely to vertical wave motion. As is well known, the earth is an elastic body and disturbances therein generate waves which are propagated in two distinct modes, namely, the transverse mode and the longitudinal mode. In transverse waves the direction of particle motion is normal to the direction of propagation, whereas in longitudinal waves the particle motion is parallel to the direction in which the disturbance is spreading.

A shot generates mainly longitudinal waves but these are partly transformed to transverse motion at surfaces of discontinuity. Since the geophones $G_1$ to $G_{10}$ are sensitive to vertical motion only, they do not respond to longitudinal waves travelling in the horizontal direction, whereas they respond well to longitudinal reflections arriving vertically from below.

The shot point 10 is to the left of the geophone array. The geophones in group A are preferably equi-spaced relative to each other, and each geophone in group B is displaced from the corresponding geophone in group A in a horizontal direction away from the shot point by a distance which is equal for all of them, and which should be made smaller than one-quarter of a wave length of the shortest of the horizontally travelling waves (from left to right) which are to be eliminated. In practice, a displacement of between $\frac{1}{20}$ and $\frac{1}{8}$ wave lengths (10 feet—100 feet depending on conditions) should give satisfactory results. The total length of the spread from the first geophone of any one channel to the last ($G_1$—$G_{10}$ in FIG. 1) should preferably not exceed 200 feet since it is intended that reflections arrive simultaneously at all geophones of any single channel. The number of geophones employed per channel may be either greater or smaller than ten, two being a minimum and twenty a practical maximum.

The geophones of group A are connected electrically in parallel, and their combined electrical outputs are fed to the input of an amplifier $A_A$ through conductors $C_1$. The geophones of group B are also connected in parallel and their combined outputs are fed to the input of an amplifier $A_B$ through conductors $C_2$. The amplifiers are of identical construction and include automatic-volume-control (A.V.C.) circuits as well as electrical filters suitable for seismic reflection work to discriminate against undesired frequency components. In addition, they are provided with volume controls which permit adjustment of the output signal voltage amplitude.

The respective signals of amplifiers $A_A$ and $A_B$ are fed to separate inputs of a compensating network CN. Network CN functions to combine additively a first value constituted by a portion of the sum of the signals with a second value constituted by the time integral of the difference of the signals. By proper adjustment of the proportion of the values being added, the effect of ground waves may be eliminated whereby only reflected waves travelling upwardly are recorded, thereby providing accurate graphical indications.

Compensating network CN, as shown separately in FIG. 2, includes two parallel branches $B_A$ and $B_B$. Branch $B_A$ includes an integrating network formed by resistor 14 and condenser 15, a first triode amplifying tube 16 and a second triode amplifying tube 17 whose output is coupled to an output transformer 18. The output of the first amplifying tube 16 is fed to the input of the second tube 17 through a capacitor 27 in series with an adjustable potentiometer P. The anode of tube 16 is connected to an anode voltage source through a resistor 28. The second branch $B_B$ comprises a triode 20 arranged as a cathode follower amplifier, the cathode circuit being connected to an output transformer 21.

The output of amplifier $A_A$ for the geophone group A is coupled to one set of input terminals 22 of the compensating network, the output of amplifier $A_B$ for geophone group B being coupled to a second set of input terminals 23. Input terminals 22 are connected to the primary 24$a$ of a transformer 24 having a pair of secondary windings 24$b$ and 24$c$, while input terminals 23 are connected to the primary 25$a$ of an identically constructed transformer 25 having a pair of secondaries 25$b$ and 25$c$.

The lower end of the secondary 24$b$ is connected through resistor 14 to the grid of tube 16 in branch $B_A$, the grid being connected through condenser 15 to anode of the tube. The upper end of secondary 24$b$ is connected to the upper end of the secondary 25$b$ whose lower end is connected to cathode of tube 16 in branch $B_A$, the cathode being grounded. The upper end of secondary 24$c$ is connected to the grid of tube 20 in branch $B_B$, while the lower end is connected to the upper end of secondary 25$c$ whose lower end is grounded. Potentiometer P is coupled capacitively between the anode of tube 16 and ground, the adjustable tap thereof being connected to te grid of tube 17 in branch $B_A$.

The anode of tube 17 in branch $B_A$ is connected to the one end of primary 18$a$ of the output transformer 18, the other end of the primary being connected to an anode voltage source. The cathode of tube 20 in branch $B_B$ is connected to one end of the primary 21$a$ of the output transformer 21, the other end of the primary being connected to ground. The anode of tube 20 is connected to an anode voltage source.

The transformer ratios of input transformers 24 and 25 are substantially one-to-one, and the interconnection of the secondaries is such that the sum of the signals from geophone groups A and B is applied to the tube 20 in branch $B_B$, whereas the difference between the group signals is applied to the integrating network 14, 15 in branch $B_A$. Secondaries 24$c$ and 25$c$ are series connected in coincidence, hence the voltages therebetween are added, while secondaries 24b and 25b are connected in series opposition, hence their voltages are subtracted.

Thus the signal developed across the primary 18 of the output transformer in branch $B_A$ is proportional to the time integral of the difference of the signals generated by the two geophone groups. At the same time appearing at the primary of transformer 21a of the output transformer in branch $B_B$ is a voltage proportional to the sum of the signals generated by the two geophone groups.

The secondaries 18b and 21b of the two output transformers are connected in series to the output terminals 26 of the compensating network whereby the output of the network is proportional to the sum of the voltages produced by the amplifier branches $B_A$ and $B_B$.

If the signals generated by geophone Groups A and B are denoted respectively by $e_1$ and $e_2$, the output E of the compensating network CN is proportional to:

$$E = b \int_0^t (e_2 - e_1) \cdot dt + \frac{1}{2} c(e_2 + e_1) \quad (1)$$

where $t$ is time, $b$ and $c$ are constants depending on circuit parameters, and where $b$ can be given a wide range of values by adjusting the potentiometer P.

The time constant of the integrating circuit is equal to the product of the resistance of resistor 14 and the capacitance of capacitor 15, and the amplification of amplifier 16. A value in excess of one second is quite satisfactory, and this value is easily attained.

The output terminals 26 of each compensating network CN are connected to the conventional recording camera 28 through a line $C_3$ and provision is made for indicating the time instant of the shot fired at the shot point 10. The time displacement between this instant and the reception of reflecced impulses provides a key to the position of the geophysical horizons (discontinuities). The nature of the recording means is more fully disclosed in the text "Geophysical Exploration" of Heiland, pages 614 et seq., Prentice-Hall Inc., 1946.

While the two amplifiers $A_A$ and $A_B$ are disclosed as being A.V.C. types, this is not essential for the operation of the invention, for only the output volume controls on those amplifiers are strictly necessary. In practice, however, the A.V.C. feature is very convenient.

Although it is not essential to the invention, the geophones $G_1$ to $G_{10}$ are preferably of the velocity type, wherein the output is substantially proportional to earth particle velocity. They should preferably have a 20 c.p.s. resonance frequency and a damping factor equal 0.6 as ordinarily employed in seismic reflection prospecting.

The Operation of the System

The first step in the operation of the invention is the adjustment of the output volume controls of amplifiers $A_A$ and $A_B$ to give equal output amplitudes. In this connection test signals from an auxiliary generator may be applied to the input of these amplifiers and the volume controls be adjusted until like outputs are indicated in suitable output meters.

Thereafter, a succession of shots may be fired at the shot point, and reflection records made with various settings of the potentiometer P the best reflection record is selected for mapping. The procedure may be repeated at all shot points in a given area which is being prospected. As a rule, however, the same setting of P should give satisfactory results for all shot points not too far removed from each other. In the course of taking successive shots at any shot point it may be found advisable to readjust one of the A.V.C. amplifier output controls to improve the appearance of the recorded reflections.

If a magnetic recorder is available, the firing of successive shots to determine the best setting for the potentiometer P may be avoided. In such case the output of the two A.V.C. amplifiers $A_A$ and $A_B$ is recorded separately, and the tape thus obtained is played repeatedly into the compensator CN. The adjustment of the potentiometer P is made during the playback operation.

Various other modifications of the procedure and apparatus of this invention will become apparent to geophysicists after a study of the theory of operation of the invention which follows.

We introduce a rectangular coordinate system with its origin at the shot point 10, the z-axis being vertical, and the positive x-axis extending through the geophone set-up which is in line with the shot point. Referring to FIG. 2, the positive $x$ direction runs from $G_1$ to $G_{10}$. We denote the vertical displacement of earth motion at the earth's surface $w(x,t)$ which explicitly shows it to be a function of position and time. Since, according to the specification, geophone signal output is proportional to velocity, it may be written as $s \cdot Dw/Dt$, where $s$ is a constant depending on geophone sensitivity, D being used for partial derivatives. Considering now the geophone pair $G_1$, $G_2$ with respective coordinates $x_1$, $x_2$, their voltage output is:

$$e_1 = s.Dw(x_1)/Dt \quad e_2 = s.Dw(x_2)/Dt \quad (2)$$

Since the geophones are close together, and in fact less than one-quarter wave length apart, we can write approximately:

$$w(x_2) - w(x_1) = (x_2 - x_1) Dw(x)/Dx$$
$$w(x_2) + w(x_1) = 2w(x) \quad (3)$$

wherein the argument $x$ on the right-hand side refers to a point midway between $G_1$ and $G_2$.

The Expression 1 for the voltage output of the compensator CN becomes, with the aid of Equations 2 and 3, $$E = s\, b(x_2 - x_1) \cdot Dw/Dx + sc \cdot Dw/Dt \quad (4)$$

which may be written as:

$$E = k(m \cdot Dw/Dx - Dw/Dt) \quad (5)$$

where $k$, $m$ are constants, and $m$ may be given a wide range of values by adjusting the potentiometer P.

Assume next that the vertical surface motion of the earth is due to reflection $f$, and to ground waves $g$, which latter are propagated outwardly from the shot point with the velocity V. Then, since reflections have the same phase for the entire geophone array of any single seismograph channel:

$$w = f(t) + g(t - x/V) \quad (6)$$

with $Df/Dx = 0$. Postulating an adjustment of the potentiometer P of FIG. 2 such that $$m = V \quad (7)$$

and substituting 6 in 5, it follows that:

$$E = k \cdot Df/Dt \quad (8)$$

which makes evident the elimination of ground waves from the compensator output, since $g$ does not appear on the right-hand side of the equation.

The same considerations can be applied with the same results to all geophone pairs in the channel, and they demonstrate that ground waves of any given velocity can be eliminated from reflection records by the use of the present invention.

In general, particularly in difficult areas, it is found that not all ground waves have the same velocity along the geophone spread. Since this invention enables us to eliminate only those of one given velocity, the adjustment of the potentiometer P should be made in a manner to annul ground waves showing the strongest interference with reflections.

After a proper setting of P has been determined empirically at a given location, it may be advantageous from a practical standpoint to keep the P setting unchanged for the whole prospect even though some improvement might be obtained by readjustment.

It is also good practice to make two records at each location, namely, one normal record with the potentiometer P set at its lowest position, and a record with P adjusted to give the best ground wave elimination.

As explained in my copending application, above identified, any linear circuit may be included in the compensator CN, provided that both parallel branches are affected in the same way. This implies, for instance, that the integrating circuit in branch $B_A$ may be omitted, provided a differentiator is introduced in branch $B_B$.

*Modified Seismic System*

In the arrangement disclosed in FIGS. 1 and 2, the outputs of the two groups of geophones are combined to cancel waves travelling horizontally with some given velocity of propagation. In the arrangement to be now described in connection with FIG. 3, it becomes possible to cancel the effects of waves propagated with two or more distinct velocities, e.g. $V_1$ and $V_2$.

In FIG. 3, the shot point 10 is shown at the left and there are three groups $a$, $b$ and $c$ of geophones provided arranged substantially in line with the shot point along the surface. Group $a$ consists of four geophones 1 to 4, group $b$ of geophones 5 to 8 and group $c$ of geophones 9 to 12. The geophones of each group are symmetrically arranged and preferably equi-spaced. The spacing between the centers of groups $a$ and $b$ should preferably be identical to that between groups $b$ and $c$.

The geophones of group $a$ are connected through wires $W_1$ in parallel relation to the input of an A.V.C. amplifier $A_a$ which may be identical in construction to seismic amplifier $A_A$ in FIG. 1. Similarly, the geophones in groups $b$ and $c$ are paralleled and connected to the inputs of seismic amplifiers $A_b$ and $A_c$, through wires $W_2$ and $W_3$ respectively.

The spacing of geophones of a group, which in its most elementary form may consist of only one geophone and in more elaborate form may consist of as many as twenty, is the usual spacing now employed in practice, namely 10 to 20 feet. The spacing between the groups ($a$, $b$ and $b$, $c$) must be smaller than a quarter of a wave length of the shortest wave of velocity $V_1$ or $V_2$ of the waves to be eliminated. The same principles described in conjunction with FIGS. 1 and 2 are applicable to the arrangement in FIG. 3.

In accordance with the invention, two or more sets of compensators are provided, depending on the number of wave velocities present in horizontally propagated waves which are to be cancelled. Thus in the case of two velocities groups $a$ and $b$ are combined in one compensator to cancel waves of velocity $V_1$ and groups $b$ and $c$ in a second compensator to cancel waves of the same velocity. The outputs of the two compenstors are then applied to a third compensator adapted to cancel waves of a different velocity $V_2$.

In FIG. 3, two sets of compensating networks are shown (total number of compensators being three). The outputs of amplifiers A$a$ and A$b$ are connected by wires $W_4$ and $W_5$ to the two inputs of compensating network CN $ab$ and the outputs of amplifiers A$b$ and A$c$ are connected through wires $W_6$ and $W_7$ to the two inputs of a second compensating network CN $bc$. These networks constitute the first set. The networks may be similar in design to that described in connection with FIG. 2 and they can be adjusted to cancel waves of velocity $V_1$ which are consequently absent in the output of these networks.

Moreover these outputs can be regarded as corresponding respectively to two geophone groups, the first $ab$ consisting of geophones 1 to 8 and the second $bc$ to geophones 5 to 12. Geophones 5 to 8 belong of course to both groups. The effective spacing of the centers of $ab$ and $bc$ is the same as the spacing between the centers $a$ and $b$ and also that of $b$ and $c$.

The outputs of the two compensators CN $ab$ and CN $bc$ of the first set are fed through wires $W_8$ and $W_9$ to the network CN $abc$ in the second set which is adjusted to cancel waves of velocity $V_2$. The output of compensating network CN $abc$ is thus free of the presence of both waves of velocity $V_1$, and waves of velocity $V_2$.

It will be evident that the process of elimination described herein may be extended to provide more geophone groups and more sets of compensators. For example, to cancel three waves having different velocities would require four geophone groups as well as three compensators in the first set, two in the second set and one in the third.

In FIG. 3, the output of the compensator CN $abc$ is connected by wires $W_{10}$ to a recording camera. The outputs of amplifiers A$a$, A$b$ and A$c$ may be magnetically recorded on tape. The tape recording is played back through a compensator set adjusted to cancel waves of velocity $V_1$ and the output of the compensator set is stored on tape. The new tape is then played back through the same set of compensators, now adjusted to cancel waves of velocity $V_2$. The output may be recorded on paper or stored on tape for further processing.

While there has been shown what are considered to be preferred embodiments of the invention, it will be manifest that many changes and modifications may be made therein without departing from the essential spirit of the invention. It is intended, therefore, in the annexed claims to cover all such changes and modifications as fall within the true scope of the invention.

What is claimed is:

1. Prospecting apparatus for detecting seismic waves originating at a shot point and reflected within the earth, ground waves from the shot point being propagated with two or more distinct velocities, said apparatus comprising at least three groups of geophones placed along the ground substantially in line with said shot point, means to combine the outputs of the geophones in each group to produce first, second and third voltages, first compensating means coupled to said first and second groups to so combine said first and second voltages as to produce a first compensated voltage in which the effect of ground waves propagated with one of said velocities is cancelled, second compensating means coupled to said second and third groups to so combine said second and third voltages as to produce a second compensated voltage in which the effect of ground waves propagated with one of said velocities is cancelled, and third compensating means responsive to said first and second compensated voltages to produce a third compensated voltage in which the effect of ground waves propagated with the other of said velocities is cancelled each of said networks including two parallel branches, one of which has volume control means therein, means to apply to the first branch a voltage representing the sum of the two input voltages applied to the respective networks, means to apply to the second branch a voltage representing the difference between the input voltages applied to the respective networks, the first branch comprising means for taking a first function of said sum voltage, the second branch comprising means for taking a second function of said difference voltage, said first function being the first derivative of said second function, and means coupled to the first and second branches additively to combine the outputs of the branches to produce the compensated voltage.

2. Apparatus as set forth in claim 1, further including camera means coupled to said third compensating means to record said third compensated voltage to produce a seismogram.

3. Prospecting apparatus for detecting seismic waves originating at a shot point and reflected within the earth, ground waves from the shot point being propagated with two or more distinct velocities, said apparatus comprising at least three groups of geophones placed along the ground substantially in line with said shot point, said geophones being symmetrically arranged and equi-spaced, means to combine the outputs of the geophones in each group to produce first, second and third voltages, first compensating means coupled to said first and second groups to so combine said first and second voltages as to produce a first compensated voltage in which the effect of ground waves propagated with one of said velocities is cancelled, second compensating means coupled to said second and third groups to so combine said second and third voltages as to produce a second compensated voltage on which the effect of ground waves propagated with the said one of said velocities is cancelled, and third compensating means responsive to said first and second compensated voltages to produce a third compensated voltage in which the effect of ground waves propagated with the other of said velocities is cancelled each of said networks including two parallel branches, one of which has volume control means therein, means to apply to the first branch a voltage representing the sum of the two input voltages applied to the respective networks, means to apply to the second branch a voltage representing the difference between the input voltages applied to the respective networks, the first branch comprising means for taking a first function of said sum voltage, the second branch comprising means for taking a second function of said difference voltage, said first function being the first derivative of said second function, and means coupled to the first and second branches additively to combine the outputs of the branches to produce the compensated voltage.

4. Apparatus as set forth in claim 3, wherein the spacing between the centers of the first and second geophone groups is identical to the spacing between the centers of the second and third geophone groups.

5. Prospecting apparatus for detecting seismic waves originating at a shot point and reflected within the earth, ground waves from the shot point being propagated with two distinct velocities, said apparatus comprising three groups of geophones placed along the ground substantially in line with said shot point, means to combine the outputs of the geophones in each group to produce first, second and third voltages, a first compensating network coupled to said first and second groups to so combine said first and second voltages as to produce a first compensated voltage in which the effect of ground waves propagated with the first of said velocities is cancelled, a second compensating network coupled to said second and third groups to so combine said second and third voltages as to produce a second compensated voltage on which the effect of ground waves propagated with said first velocity is cancelled, and a third compensating network coupled to the output of said first and second networks and responsive to said first and second compensated voltages to produce a third compensated voltage in which the effect of ground waves propagated with the second of said velocities is cancelled each of said networks including two parallel branches, one of which has volume control means therein, means to apply to the first branch a voltage representing the sum of the two input voltages applied to the respective networks, means to apply to the second branch a voltage representing the difference between the input voltages applied to the respective networks, the first branch comprising means for taking a first function of said sum voltage, the second branch comprising means for taking a second function of said difference voltage, said first function being the first derivative of said second function, and means coupled to the first and second branches additively to combine the outputs of the branches to produce the compensated voltage.

6. Prospecting apparatus for detecting seismic waves originating at a shot point and reflected within the earth, ground waves from the shot point being propagated with two or more distinct velocities, said apparatus comprising at least three groups of geophones placed along the ground substantially in line with said shot point, means to combine the outputs of the geophones in each group to produce first, second and third voltages, a first compensating network coupled to said first and second groups to so combine said first and second voltages as to produce a first compensated voltage in which the effect of ground waves propagated with one of said velocities is cancelled, a second compensating network coupled to said second and third groups to so combine said second and third voltages as to produce a second compensated voltage on which the effect of ground waves propagated with the said velocities is cancelled, and a third compensating network coupled to the first and second networks and responsive to said first and second compensated voltages to produce a third compensated voltage in which the effect of ground waves propagated with the other of said velocities is cancelled, each of said networks including two parallel branches one of which has volume control means therein, means to apply to the first branch a voltage representing the sum of the two input voltages applied to the respective networks, means to apply to the second branch a voltage representing the difference between the input voltages applied to the respective networks, the second branch being provided with integrating means, and means coupled to the first and second branches additively to combine the outputs of the branches to produce the compensated voltage.

7. Prospecting apparatus for detecting seismic waves originating at a shot point and reflected within the earth, ground waves from the shot point being propagated with two or more distinct velocities, said apparatus comprising at least three groups of geophones placed along the ground substantially in line with said shot point, means to combine the outputs of the geophones in each group to produce first, second and third voltages, a first compensating network coupled to said first and second groups to so combine said first and second voltages as to produce a first compensated voltage in which the effect of ground waves propagated with one of said velocities is cancelled, a second compensating network coupled to said second and third groups to so combine said second and third voltages as to produce a second compensated voltage on which the effect of ground waves propagated wtih the said velocities is cancelled, and a third compensating network coupled to the first and second networks and responsive to said first and second compensated voltages to produce a third compensated voltage in which the effect of ground waves propagated with the other of said velocities is cancelled, each of said networks including two parallel branches one of which has volume control means therein, means to apply to the first branch a voltage representing the sum of the two input voltages applied to the respective networks, means to apply to the second branch a voltage representing the difference between the input voltages applied to the respective networks, the first branch being provided with differentiating means, and means coupled to the first and second branches additively to combine the outputs of the branches to produce the compensated voltage.

References Cited in the file of this patent
UNITED STATES PATENTS

| | | |
|---|---|---|
| 1,959,004 | Owen | May 15, 1934 |
| 2,184,313 | Owen | Dec. 26, 1939 |
| 2,623,113 | Bayhi et al. | Dec. 23, 1952 |
| 2,657,373 | Piety | Oct. 27, 1953 |
| 2,740,945 | Howes | Apr. 3, 1956 |
| 2,872,995 | Wolf | Feb. 10, 1959 |